United States Patent [19]

Strid

[11] Patent Number: 5,620,598

[45] Date of Patent: Apr. 15, 1997

[54] SUCTION HEAD ARRANGED BETWEEN A FILTRATE CHANNEL AND A BAROMETRIC LEG OF A ROTATING FILTER

[75] Inventor: Kent Strid, Järbo, Sweden

[73] Assignee: Kvaerner Hymac AS, Lier, Norway

[21] Appl. No.: 436,406

[22] PCT Filed: Nov. 19, 1993

[86] PCT No.: PCT/SE93/01000

§ 371 Date: Jul. 20, 1995

§ 102(e) Date: Jul. 20, 1995

[87] PCT Pub. No.: WO94/12261

PCT Pub. Date: Jun. 9, 1994

[30] Foreign Application Priority Data

Nov. 20, 1992 [SE] Sweden .................... 9203495

[51] Int. Cl.⁶ .................................................. B01D 33/80
[52] U.S. Cl. .......................... 210/324; 210/334; 210/402; 210/404
[58] Field of Search ..................... 210/324, 334, 210/402, 404

[56] References Cited

U.S. PATENT DOCUMENTS

| 3,024,839 | 3/1962 | Beachler | 162/364 |
| 4,626,351 | 12/1986 | Fuhring | 210/234 |
| 4,929,355 | 5/1990 | Ragnegard et al. | 210/402 |
| 5,047,123 | 9/1991 | Aranitakis | 210/234 |

FOREIGN PATENT DOCUMENTS 1015850  1/1966  United Kingdom .

Primary Examiner—W. L. Walker
Attorney, Agent, or Firm—Quarles & Brady

[57] ABSTRACT

A suction head arranged between a filtrate channel and a barometric leg of a rotating filter having at least one filter means communicating with the filtrate channel. The filtrate channel is connected to the barometric leg through the suction head. In order to ensure continuous conveyance of air bubbles brought along the filtrate, the upper internal boundary of the suction head as regards flow towards the barometric leg is nowhere located at a level above the upper internal boundary of the barometric leg.

13 Claims, 4 Drawing Sheets

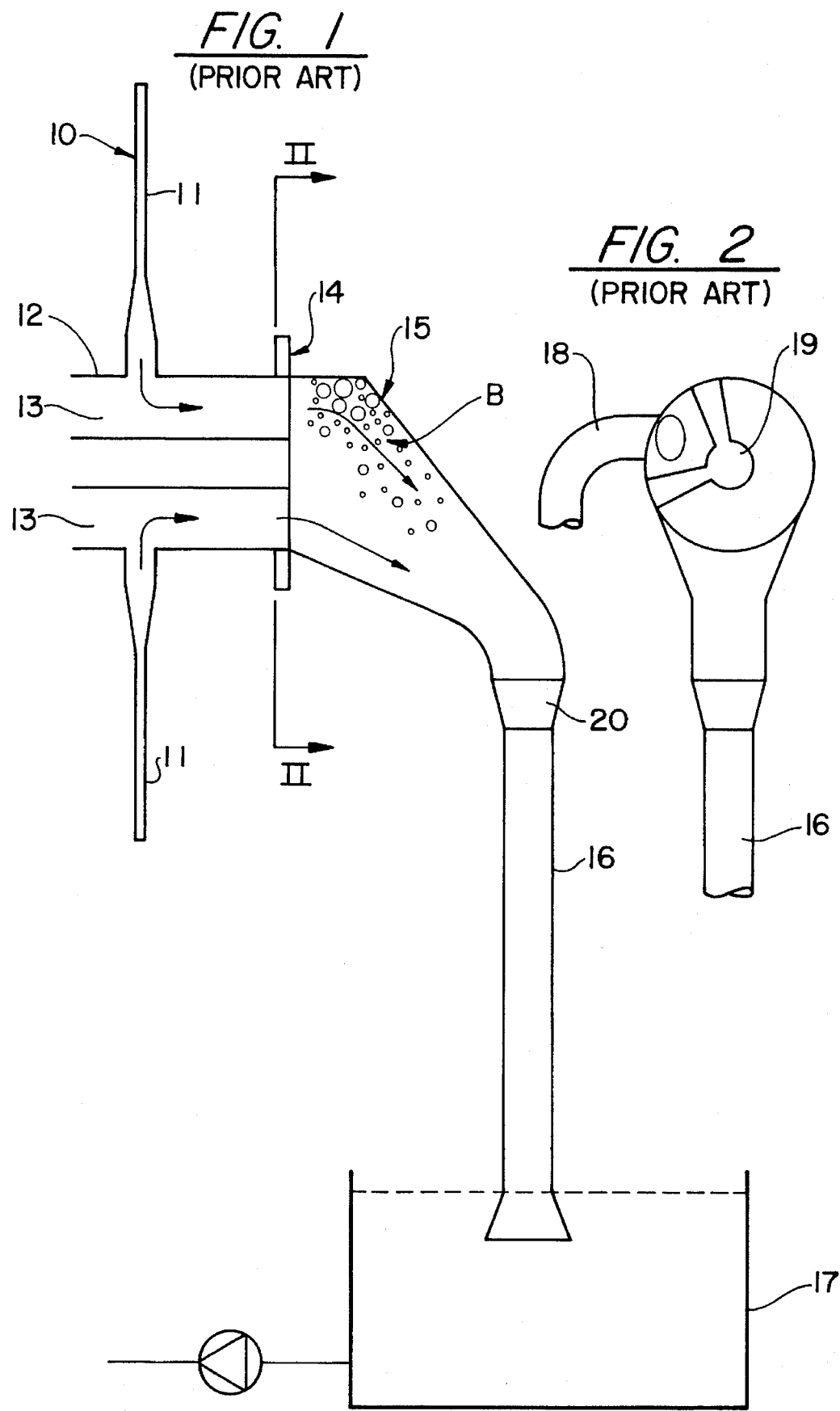

SUCTION HEAD ARRANGED BETWEEN A FILTRATE CHANNEL AND A BAROMETRIC LEG OF A ROTATING FILTER

The present invention concerns a suction head arranged between a filtrate channel and a barometric leg of a rotating filter having at least one filter means communicating with the filtrate channel, the filtrate channel being connected to the barometric leg through the suction head.

According to the state of art (FIGS. 1 and 2 referring to a disc filter) the suction head tapers in the shape of a downwardly inclined cone towards the barometric leg and is connected thereto by a likewise conically tapering connecting piece, the outlet end of which has the cross-sectional area of the barometric leg. A problem observed for a long time in rotating filters is that the air accompanying the filtrate through the filtrate channel tends to settle in the upper part of the suction head and expands there due to the prevailing sub-pressure, resulting in that relatively large air bubbles intermittently are brought along by the air flow accelerating towards the barometric leg. As a result of the pressure successively decreasing with increasing flow rate, the volume of the air bubbles increases further, which results in that an unsatisfactory portion of the height of the barometric leg transports merely air. It can be mentioned as typical, that in a barometric leg of seven meters of height the air bubbles brought along may reduce the capacity of the barometric leg to correspond to merely three meters of water column. Thus, a very large saving in space and costs could be made if an effective barometric leg of in this case only three meters of height could be utilized. Further, the conveyance of air bubbles results in that the sub-pressure in the filtrate channel varies or lies at a constantly low level, which in turn results in a varying or low filtering capacity and a varying or low dry content in the filter cake deposited on the filter medium. It is, thus, also a desire that the sub-pressure shall be kept constant.

Consequently, the object of the present invention is to provide a suction head that does not allow the accumulation of air bubbles but continuously brings them along as soon as they arrive into the suction head from the filtrate channel.

This object is achieved in that the upper internal boundary of the suction head as regards flow towards the barometric leg is nowhere located at a level above the upper internal boundary of the barometric leg. Thereby pockets are avoided in which air bubbles may accumulate, and occurring small air bubbles are immediately pulled along by the filtrate flow without managing to combine into larger air bubbles.

Thus, the upper internal boundary of the suction head as regards flow towards the barometric leg may raise in the flow direction towards the barometric leg. However, this boundary is preferably straight and horizontal and merges with the upper internal boundary of the barometric leg. In such case, also this should be straight and horizontal. This involves the favourable effect that the barometric leg gains further in height without the total height of the structure increasing. It is also suitable that the connection of the suction head towards the barometric leg has the dimension of the barometric leg, so that the barometric leg can be directly connected to the suction head. Hereby the filtrate flow assumes the flow rate in the barometric leg already at the outlet end of the suction head. Thus, the filtrate has accelerated to full flow rate in the suction head, which further contributes to the conveyance of existing air bubbles.

In the following description of two embodiments of the present invention, the invention is applied to disc filters having at least one filter disc including a plurality of filter sectors communicating with a respective filtrate channel in the centre shaft of the filter. However, the invention is equally applicable to disc filters having one single filtrate channel in the centre shaft common to all filter sectors, as well as to other types of rotating filters, such as drum filters, provided a barometric leg is employed to create the sub-pressure necessary for the filtration.

In the accompanying drawings:

FIG. 1 shows schematically, in comparison to the invention, a vertical section through the outlet end of a centre shaft of a disc filter with suction head and barometric leg according to the state of art;

FIG. 2 shows a section along the line II—II of FIG. 1;

Figure 3:
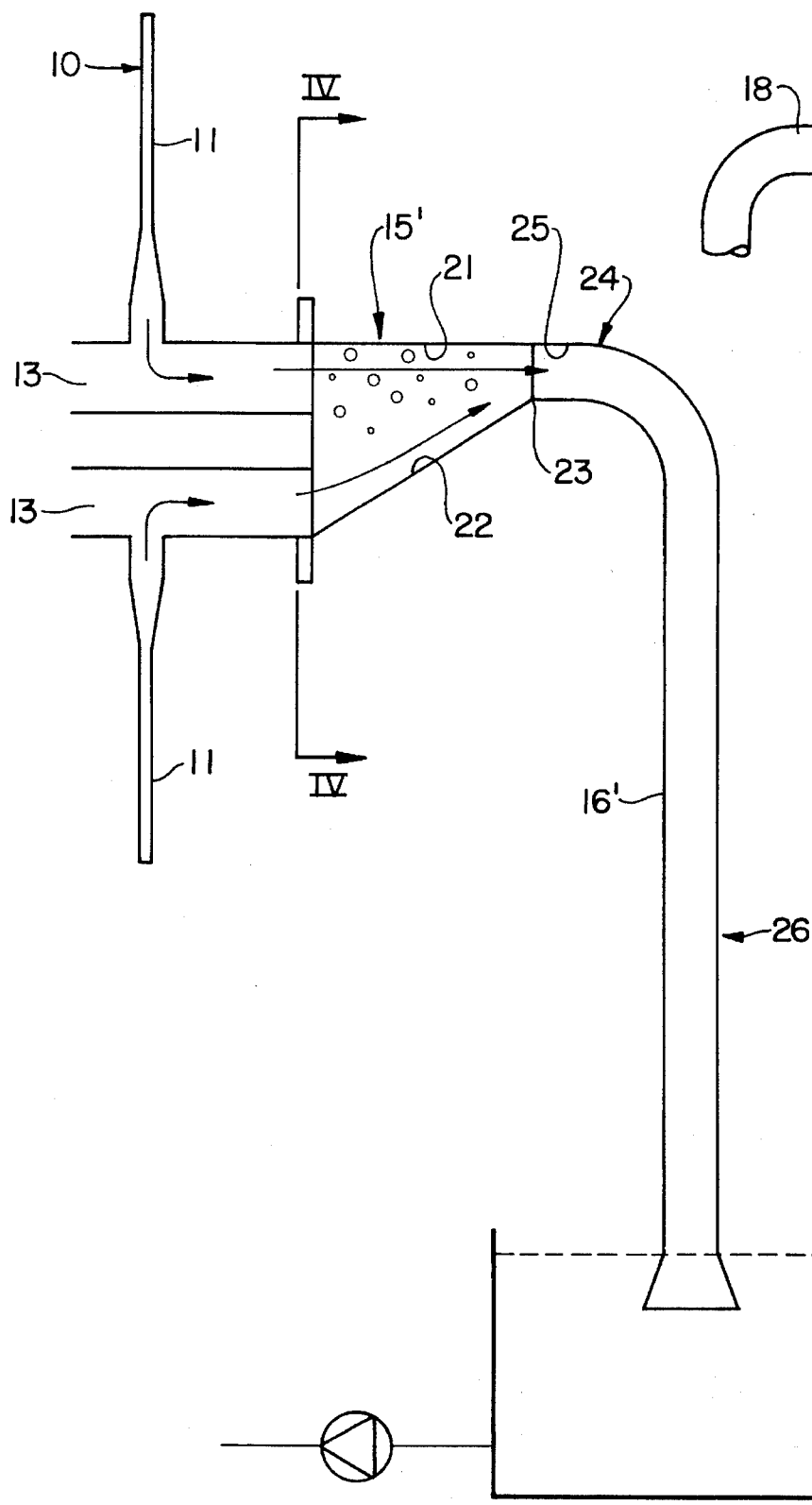
FIG. 3 shows in the same manner as FIG. 1 a section through the outlet end of a disc filter with suction head and barometric leg according to a first embodiment of the present invention.

In FIGS. 1 and 2, showing the state of art, 10 designates a filter disc comprising a plurality of annularly arranged filter sectors 11. These are mounted on a rotatable centre shaft 12 including a number of axial filtrate channels 13 corresponding to the number of filter sectors. Each filtrate channel communicates with the interior of a filter sector 11, so that filtrate from the filter sectors is directed into the filtrate channels and further through a filtrate valve 14 to a suction head 15. The filtrate valve functions in such a manner that, upon rotation of the centre shaft, a certain rotational sector (clear filtrate zone and drying zone) of the filtrate channels is brought into communication with a barometric leg 16 having a height of generally seven meters and discharging into a filtrate vessel 17, while the remainder of the filtrate channels are brought into communication with an outlet 18 for pre-filtrate (pre-filtrate zone). This is accomplished by means of a stationary so-called wear plate or bridge 19, the larger sector of which communicating in this case with the barometric leg 16 and the smaller sector of which communicating with the outlet 18.

It has previously been considered that the suction head 15 should have substantially the shape shown in FIG. 1 which was considered adequate for the flow, i.a., because it directed the filtrate flow downwards towards the barometric leg 16. However, this has proven to involve the initially mentioned problem of air bubbles B accumulating in the upper portion of the suction head 15. Furthermore, a conical transition 20 has been used between the outlet end of the suction head and the barometric leg resulting in that the filtrate has reached its final flow rate not until in the barometric leg.

Figure 4:
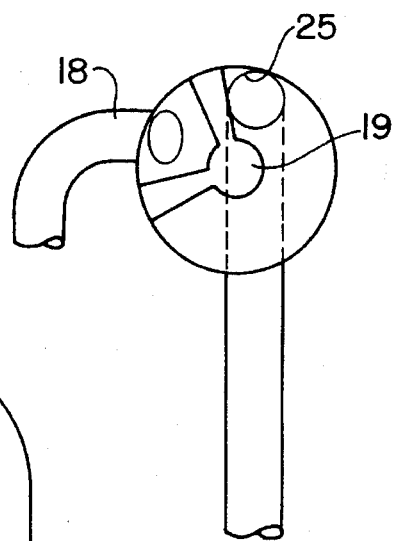
FIG. 4 shows a section along the line IV—IV of FIG. 3.
Figure 5:
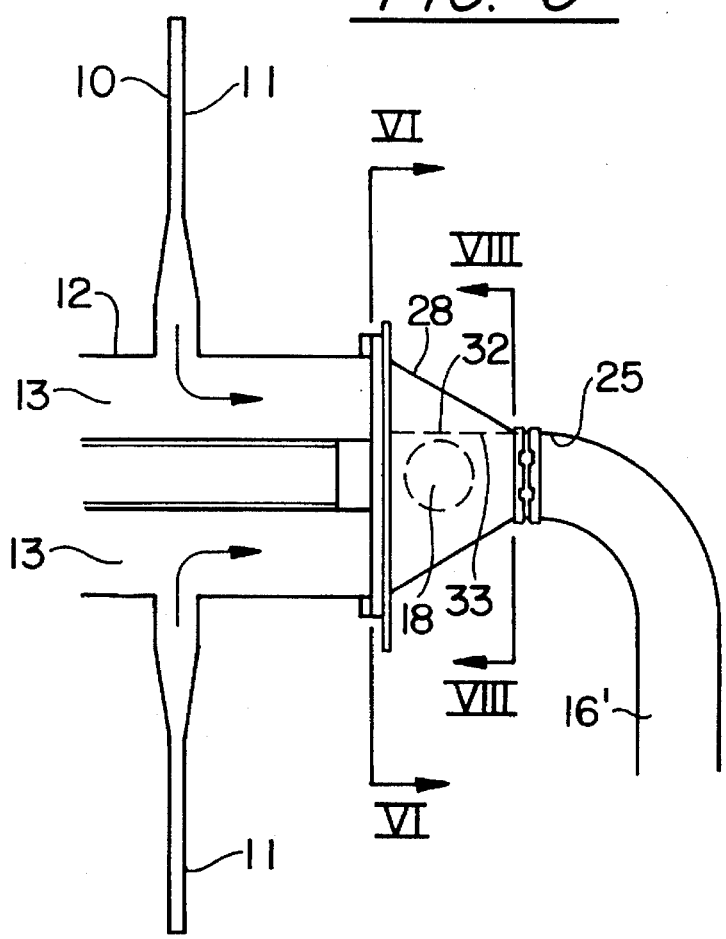
FIG. 5 shows a side view of the outlet end of a disc filter with suction head and barometric leg according to a second embodiment of the present invention.
Figure 6:
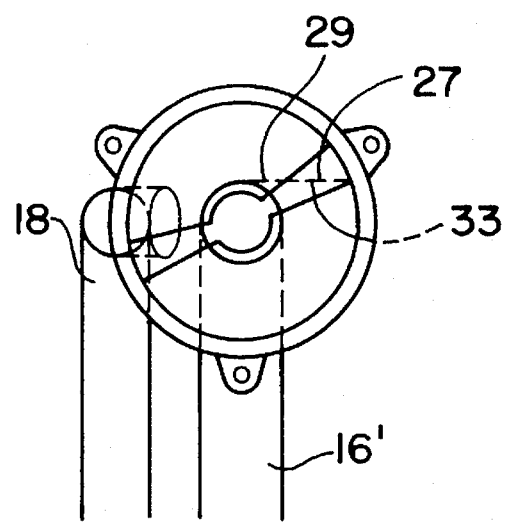
FIG. 6 shows a section along the line VI—VI of FIG. 5.
Figure 7:
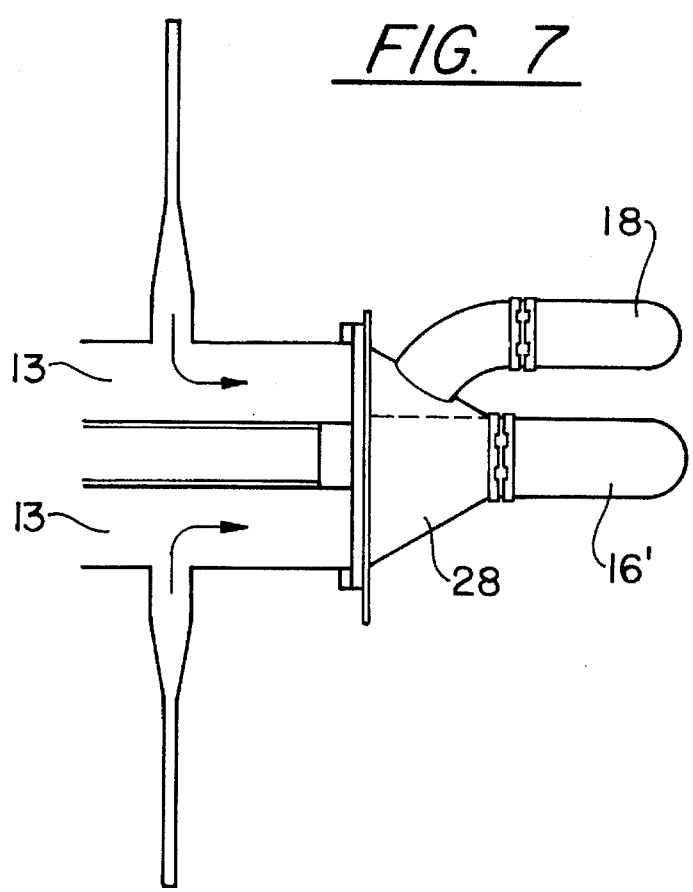
FIG. 7 shows a plane view of the subject of FIG. 5.

In the embodiment of the present invention shown in FIGS. 3 and 4, all parts correspond to those shown in FIGS. 1 and 2, except for the suction head and the barometric leg. Therefore, equal parts have the same reference numerals as before, whereas reference numerals for parts new for the present invention have been completed with a prime ('). Thus, according to the present invention, the suction head 15' has an upper internal boundary 21 that nowhere is situated at a higher level than any point at the interior of the upper boundary of the barometric leg 16'. In the embodiment shown, the boundary 21 is straight and extends horizontally outwards towards the barometric leg 16' at the same time as a lower boundary 22 extends upwards towards the barometric leg. Both boundaries terminate in the outlet end 23 of the suction head, the outlet end having the same cross section as the connecting barometric leg 16'. The barometric leg 16' has a first straight and horizontal portion 24, the internal upper boundary 25 of which is nowhere located at a level beneath any point at the upper internal boundary 21 of the suction head 15'. The first portion 24 of the barometric leg merges into a vertical second portion 26 opening out into a filtrate vessel 17.

By means of the arrangement of the suction head 15' now described, i.e., the total lack of an air bubble accumulating pocket in the upper portion of the suction head, but instead the existence of an at least horizontal internal upper boundary 21, along which takes place an accelerating flow of filtrate towards the barometric leg, a continuous conveyance of small air bubbles introduced in the suction head is ensured, whereby the formation of larger air bubbles is prevented.

As appears from FIGS. 1 and 3 drawn on the same scale, the present invention provides not only the first hand objective to prevent air accumulation but also that the barometric leg can be made higher—in practice an increase of about one meter with the same position of the filtrate vessel 17—or—as a result of the improved barometric leg capacity achieved by the present invention—lower, which results in a lower overall constructional height of the entire structure.

Figure 8:
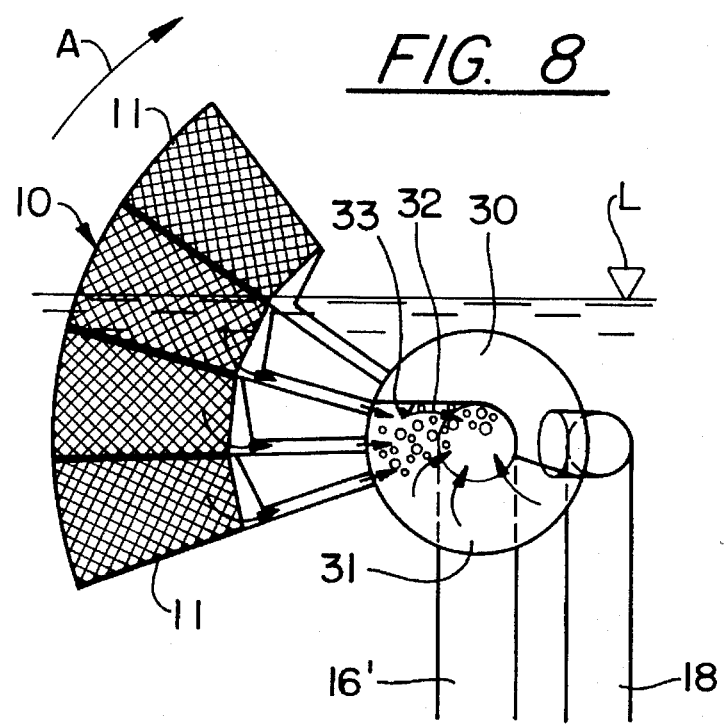
FIG. 8 shows a section along the line VIII—VIII of FIG. 5 with the casing of the suction head removed.

The embodiment shown in FIGS. 5, 6, 7 and 8 concerns the case where the pre-filtrate zone as well as the clear filtrate and drying zone are arranged in another way than in FIGS. 3 and 4, where the clear filtrate and drying zone extends up to a highest located filtrate channel 13. As appears from the shape and location of the wear plate 27 in FIG. 6, the clear filtrate and drying zone, i.e., the zone within which the filtrate channels in the centre shaft communicate with the barometric leg, ends in an earlier rotational position, in which the casing of the suction head 28 cannot constitute the internal upper boundary on which no point is situated above any internal upper point in the barometric leg. Instead, in this case, inside the suction head is arranged a shield 29, best shown in FIG. 8, wherein the casing of the suction head is removed. The shield 29 divides the interior of the suction head in a fluid and gas tight manner in two separate parts, of which the upper part 30 communicates with the outlet 18 for pre-filtrate and the lower part 31 communicates with the barometric leg 16'. The shield 29 includes a portion 32 extended in the cross-wise direction as well as the length-wise direction (flow direction) of the suction head, the lower boundary surface 33 of said portion nowhere being situated above any internal point on the upper boundary of the barometric leg. In FIG. 8 is also shown the level L of a liquid to be filtered and which is contained in a non-shown vessel in which the filter disc 10 and its filter sectors 11 are rotating. As appears, three of the filter sectors shown are positioned within the clear filtrate and drying zone (i.e., they are influenced by the vacuum of the barometric leg 16'), while the fourth filter sector has rotated in the direction of arrow A and has left this zone. FIG. 8 shows the positions of the barometric leg 16' and the outlet 18 in broken lines since they are located above the drawing plane.

I claim:

1. A suction head (15; 28) arranged between a filtrate channel (13) and a barometric leg (16') of a rotating filter having at least one filter means (10, 11) communicating with the filtrate channel (13), the filtrate channel (13) being connected to the barometric leg (16') through the suction head (15; 28), wherein an internal upper boundary (21; 33) of the suction head (15'; 28), as regards flow towards the barometric leg, is straight and horizontal and is nowhere located at a level above a likewise straight and horizontal internal upper boundary (25) of the barometric leg (16'), said internal upper boundary (21; 33) of the suction head merging into said straight and horizontal internal upper boundary (25) of the barometric leg.

2. A suction head according to claim 1, wherein a connection between the suction head and the barometric leg (16') has the dimension of the barometric leg.

3. A suction head according to claim 2, characterized in that its upper internal boundary (21) as regards flow towards the barometric leg comprises a casing of the suction head.

4. A suction head according to claim 2, characterized in that its upper internal boundary (33) as regards flow towards the barometric leg comprises a lower surface of a shield (29) arranged in the suction head.

5. A suction head according to claim 1, wherein said upper internal boundary (21) as regards flow towards the barometric leg comprises a casing of the suction head.

6. A suction head according to claim 5, characterized in that its upper internal boundary (33) as regards flow towards the barometric leg comprises a lower surface of a shield (29) arranged in the suction head.

7. A suction head according to claim 1, wherein said upper internal boundary (33) as regards flow towards the barometric leg comprises a lower surface of a shield (29) arranged in the suction head.

8. A suction head according to claim 1, characterized in that its connection to the barometric leg (16") has the dimension of the barometric leg.

9. A suction head according to claim 1, characterized in that its connection to the barometric leg (16") has the dimension of the barometric leg.

10. A suction head according to claim 1, wherein said upper internal boundary (21) as regards flow towards the barometric leg comprises a casing of the suction head.

11. A suction head according to claim 1, characterized in that its upper internal boundary (21) as regards flow towards the barometric leg comprises a casing of the suction head.

12. A suction head according to claim 1, wherein said upper internal boundary (33) as regards flow towards the barometric leg comprises a lower surface of a shield (29) arranged in the suction head.

13. A suction head according to claim 1, characterized in that its upper internal boundary (33) as regards flow towards the barometric leg comprises a lower surface of a shield (29) arranged in the suction head.

* * * * *